Oct. 8, 1957 P. G. IPSEN ET AL 2,809,010
SHUT-OFF VALVE
Filed Sept. 14, 1954

Inventors:
Peter G. Ipsen
Kenneth C. Cotton
by *Kiess*
Their Attorney

United States Patent Office 2,809,010
Patented Oct. 8, 1957

2,809,010

SHUT-OFF VALVE

Peter G. Ipsen, Schenectady, and Kenneth C. Cotton, Scotia, N. Y., assignors to General Electric Company, a corporation of New York Application September 14, 1954, Serial No. 456,004

2 Claims. (Cl. 251—86)

This invention relates to shut-off valves for high pressure fluids, particularly to stop valves for shutting off flow of steam to an elastic fluid pressure turbine or other consumer.

An object of the invention is to provide a valve which is simple to manufacture and can be conveniently assembled and disassembled for service and repair.

Another object is to provide a valve with a pivoted disk member which will positively seat in the closed position.

A further object is to prevent "fluttering" of the valve disk when in the open position.

A still further object is to reduce the pressure loss which occurs across the valve.

Figure 1:
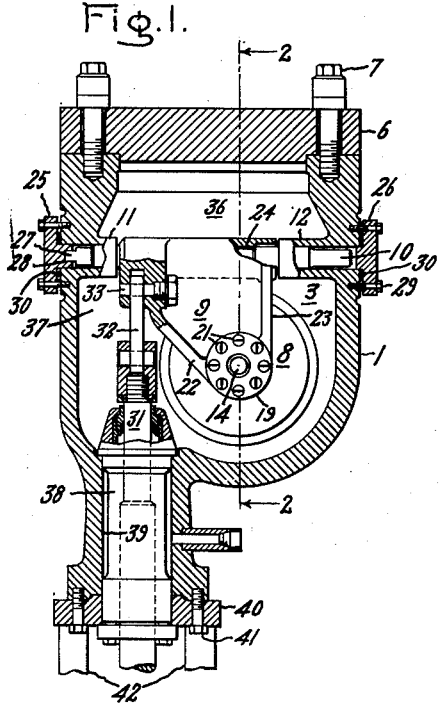
Figure 2:
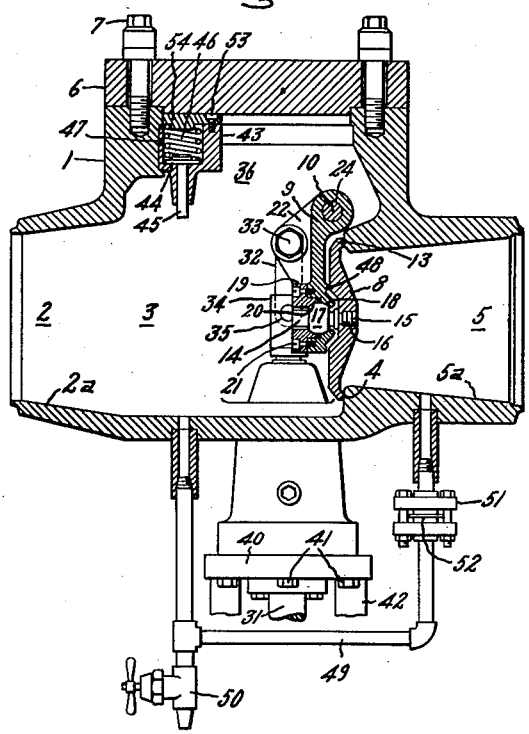
Figure 3:
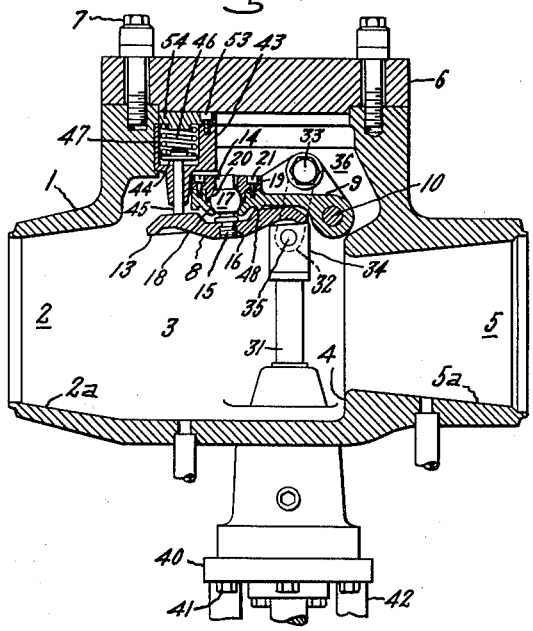

Other objects and advantages will become apparent from the following description taken in connection with the accompanying drawings, in which Fig. 1 is a sectional view of a shut-off valve made in accordance with the invention, Fig. 2 is a sectional view taken along lines 2—2 of Fig. 1, and Fig. 3 is a sectional view showing the valve in the open position.

Generally stated, the invention is practiced by providing a valve of the type described with a pivoted disk member which, in the open position, is located out of the path of the flow stream and in such position is prevented from vibrating or "fluttering" by an associated dampening means.

Referring to Fig. 2, it will be seen that the valve comprises a housing 1 provided with an inlet chamber 2 opening into a valve chamber 3, a valve seat portion 4, and a discharge chamber 5. For ease of assembly the valve chamber 3 is open at the top and is closed by a plate 6 which is secured to the housing by bolts 7.

When a valve of this type is used in a steam line it is very important that the pressure drop across the valve be as small as possible. This pressure drop has a direct bearing on the power plant efficiency. As is well known to one skilled in the art of fluid mechanics, a pressure drop is caused by too sudden enlargement or contraction of passages in which the fluid is flowing. The greatest enlargement of the valve passage and therefore a large portion of the pressure drop through the valve takes place at the junction between the inlet chamber 2 and the chamber 3 containing the valve disk mechanism. It has been the practice in the past to make the flow path in the inlet portion of the valve housing generally cylindrical. However, at the junction between a cylindrical inlet portion and a valve chamber there is a very sudden enlargement in effective flow path area with a resulting large pressure drop. It will be appreciated that if the velocity of the fluid flowing into the valve chamber is reduced and the static pressure increased, relative to that in the supply conduit, the pressure drop at the junction of the inlet passage and the valve chamber will be reduced. Stated in another manner, if the difference in cross sectional area between the inlet and valve chambers is decreased, a smaller pressure drop will result. To accomplish this, the inlet chamber 2 of the valve has been designed in the shape of a diffusing passage 2a. This diffuser increases the static pressure and reduces the velocity of the steam at the junction between the inlet and valve chambers. Thus, the pressure drop between the inlet and valve chambers with a diffuser shaped inlet is substantially less than with a cylindrical inlet portion having the same diameter as the inlet of the diffuser.

A diffuser 5a on the outlet side of the valve provides for a smaller seating area and therefore a smaller valve disk is required. The advantage of having a smaller valve disk outweighs the very small pressure loss incurred by the fluid when passing from the enlarged valve chamber 3 to the smaller outlet chamber 5.

The flow control member comprises a pivoted assembly consisting of a disk member 8 supported on a frame member 9 which is in turn supported on a transverse pivot 10 journaled in the opposite walls of the housing as shown at 11, 12 in Fig. 1.

The disk member 8, located in the valve chamber 3, defines a circumferential lip 13 which is adapted to sealingly engage the valve seat 4. The disk 8 is connected to the support member 9 by a rod 14. The rod 14 has a threaded portion 15, which is received in the opening 16 in the disk 8, and an intermediate spherical portion 17. The spherical portion 17 seats on the lower spherical surface 18 defined by the support member 9, and is held in place by the retaining ring 19 which defines an upper spherical seating surface 20. The retaining ring 19 is fastened to the support member by screws 21. The spherical connection between the valve disk 8 and its supporting member 9 provides for free relative movement between the disk 8 and the support member 9 thus allowing the valve disk 8 to seat positively on the valve seat 4 in spite of manufacturing errors, or changes in position or shape due to thermal changes.

When the valve disk is in the closed position (as in Fig. 2) it is of course maintained positively seated by the inlet pressure in valve chamber 3 which acts against the back of the disk.

Support member 9, a triangular shaped forging with reinforced edge portions 22, 23 defines at its end opposite that which is connected to the valve disk a cylindrical bearing portion 24. This bearing portion 24 is adapted to receive a shaft 10 about which the support member 9 rotates.

The shaft 10 is supported in bushing portions 11, 12 defined by the opposed walls of housing 1. The bushing portions 11, 12 are closed by end caps 25, 26. The shaft 10 is fixed against rotation by the tongue 27 and groove 28 arranged in the shaft 10 and end cap 25 respectively. The end caps 25, 26 are secured to the housing by bolts 29. Leakage is prevented between the end caps 25, 26 and the housing by gaskets 30. The end caps thus serve the dual functions of cover plates for the journals and as key means for preventing rotation of the shaft.

The actuating means for positioning the disk assembly comprises a suitable hydraulic motor or equivalent (not shown) adapted to position a reciprocable valve stem 31 connected by a link 32 to the valve disk support member 9.

Connected to the flange portion 22 at a point between the shaft 10 and the spherical connection between the support member 9 and valve disk 8 by a pin 33 is a link 32. The link 32 is connected at its other end to a clevis 34 by a pin 35. The clevis 34 is in turn threadedly secured to the valve stem 31. The pivot 33 is parallel to but offset transversely from the shaft 10 to provide the lever arm for moving the valve disk to open or closed position. By reference to Fig. 3 it will be seen that in the open position also, the orientation of the shaft 10, pivots 33, 35 are such as to give substantially the same effective lever arm.

The connection between the support member 9 and the shaft 10 and valve stem 31 respectively is located in the auxiliary chambers 36, 37 adjacent the flow path. The valve stem 31 is arranged in the support bushing assembly 38 secured to the inner wall of the inlet chamber. The housing defines an opening 39 in the wall of the valve chamber 3 through which the end portion of the valve stem 31 extends and which is adapted to be connected to the motor (not shown) for raising or lowering the valve disk. The bushing assembly 38 is positively located in the valve housing by the plate 40 and bolt means 41.

For the purpose of actuating the valve stem 31, a motor (not shown) may be supported by the rods 42. The bushing assembly 38 which supports the reciprocable valve stem 31 may be provided with an annular shoulder stem seal of the general type disclosed in United States patent to G. B. Warren et al, 2,483,163, issued September 27, 1949.

With the link connection between the valve disk and the valve stem, the vertical movement of the valve stem pivots the valve disk about the shaft 10 to an open or closed position. As can be seen from Fig. 3 the link 32 in the valve open position forms an acute angle with the axis of the valve stem.

When in the open position as shown in Fig. 3 the disk 8 substantially serves to close off from the chamber 3 the auxiliary chamber 36 which contains the snubber assembly 43, the actuating link 32 and the support member 9 for the disk 8. The valve disk 8 thus is so located as to serve as the upper surface of the flow path for the fluid, thus allowing the fluid to pass wtih a minimum of disturbance and with a minimum of dynamic forces caused by the fluid impinging on the valve disk. The valve disk also serves as a shield tending to prevent the fluid circulating into chamber 36, thus preventing any entrained impurities (such as boiler compounds in the steam) from getting into the joints between working parts, in the auxiliary chamber 36, thus adding longer life to the valve, and reducing friction and tendency to stick.

It will be noted that, if the valve disk is supported only by the ball and socket arrangement of the valve disk holding assembly, there will be a tendency for the valve disk to vibrate or "flutter" when in the open position. Because of the tremendous forces imposed on the disk by the high velocity steam, this fluttering can be so deleterious as to appreciably shorten the life of the valve. This tendency of the disk 8 to flutter is partially overcome by providing the auxiliary chamber 36 between the flow path and the closure 6, in which the valve disk 8 is disposed when in the open position. Thus the disk is largely "sheltered" from the direct impact of the fluid stream. The valve actuating means are located in a second auxiliary chamber 37 formed along the side of the valve between the flow path and the valve housing 1.

Thus, it can be seen that the valve stem 31, link 32, support member 9 and the journals therefor are housed in these auxiliary chambers 36, 37 and are not in the main flow path. This arrangement prevents the rapidly flowing fluid from impinging on the valve disk and imparting to it dynamic forces which cause the fluttering to take place. To further prevent fluttering from taking place, a dampening means generally illustrated at 43 is provided. The dampening means 43 is located in the auxiliary chamber 36 and comprises a piston 44 which has extending therefrom a rod 45 adapted to be engaged by the valve disk 8 when in the open position (Fig. 3). The dampening action is provided by the force of the spring 46 disposed between the housing 47, containing the piston 44 and spring 45, and the piston 44. The portion of the valve disk 8 located on the side opposite the dampening means is urged against the lip 48 which extends from the lower side of the support member 9.

Thus it can be appreciated that when the valve is in the open position, as shown in Fig. 3, diametrically opposite portions of the disk member are supported at opposite sides of the ball and socket joint, and the fluid coming into contact with the disk will not cause it to flutter.

Communicating between the inlet and outlet chambers is a bypass conduit 49. This bypass arrangement enables fluid pressure to be equalized on both sides of the valve so that it can be easily opened. This bypass arrangement also enables the fluid on the downstream side of the valve to bleed out to the condenser through the shut-off valve 50 in the event fluid becomes trapped in the upstream portion when the valve is closed. The coupling 51 contains orifice plate 52 which determines the amount of continuous bleed through the bypass. This continuous bleed makes for quicker starting of the turbine when the main stop valve is reopened to initiate supply of steam to chamber 3.

The various components of this valve assembly are proportioned so as to facilitate assembly and disassembly of the valve. After the cover member 6 is removed, the snubber spring 47 and plunger 44 can be readily removed merely by removing the screws 53 and the cover plate 54. The end plates 25, 26 can then be taken off, the shaft 10 withdrawn, and the pin 33 removed thereby allowing the support member and valve disk to be lifted out of the valve housing for checking and cleaning.

With the operating motor disconnected from the stem 31, and the plate 40 and bolts 41 removed, the valve stem 31 and bushing assembly 38 may be removed for servicing.

Thus it will be seen that the invention provides a pivoted type shut-off valve which will positively seat in the closed position and which is effectively prevented from fluttering in the open position by locating the valve disk out of the fluid flow path and providing special dampening means for the disk.

While a single embodiment of the invention has been described in detail herein, it will be obvious to those skilled in the art that many changes and substitutions of equivalents might be made. For instance, the connection between the valve head and its support member may be of any type permitting appropriate pivotal movement. It is, of course, desired to cover by the appended claims all such modifications as wall within the true spirit and scope of the invention.

What we claim as new and desire to secure by Letters Patent of the United States is:

1. A shut-off valve comprising a housing defining an inlet chamber, an outlet chamber, an intermediate valve chamber, and an auxiliary chamber at the side of the flow path defined by said inlet, intermediate, and outlet chambers, a valve seat formed in the housing defining a valve opening between the intermediate and outlet chambers, a valve disk in the valve chamber arranged to sealingly engage the seat, a valve disk support member having a lip extending from the underside thereof, means connecting the valve disk to the support member whereby there is relative movement therebetween, an annular bearing portion defined by the support member at one end thereof, a shaft extending through said annular bearing portion and the housing, a valve actuating means connected to the support member between said one end thereof and the valve disk connecting means whereby the valve actuating means pivots the valve disk to an open or closed position about said shaft, the valve disk when in the open position being located substantially in said auxiliary chamber and serving as a portion of the wall defining the main flow path through the valve, a dampening means disposed in said auxiliary chamber adapted to be contacted by the valve disk in the open position, the dampening means comprising spring means resiliently urging the valve disk against said lip whereby the valve disk is supported against fluttering.

2. A shut-off valve comprising a housing defining an inlet chamber, an outlet chamber, an intermediate valve chamber, and an auxiliary chamber at the side of the flow path defined by said inlet, intermediate, and outlet chambers, a valve seat formed in the housing defining a valve opening between the intermediate and outlet chambers, a pivoted valve means in the valve chamber adapted to sealingly engage the valve seat, the pivoted valve means comprising a support member and a valve disk member connected to said support member by a ball and socket arrangement to effect limited pivotal movement between the valve disk and support member, means for moving the valve disk to closed position with the disk sealingly engaging said valve seat and to open position with the disk disposed in said auxiliary chamber, and a resilient vibration dampening means disposed in said auxiliary chamber comprising a resiliently biased member having a portion engaging a rim portion of the disk at a point remote from the valve means pivot, whereby a diametrically opposite portion of the disk is biased into firm engagement with the disk support to prevent the disk from fluttering.

References Cited in the file of this patent

UNITED STATES PATENTS

| | | |
|---|---|---|
| 1,273,304 | Yates | July 23, 1918 |
| 1,602,236 | Marscheider | Oct. 5, 1926 |
| 1,604,529 | Meyrowitz | Oct. 26, 1926 |
| 2,179,707 | Bernhardt | Nov. 14, 1939 |
| 2,203,120 | Young | June 4, 1940 |
| 2,414,751 | Ludeman | Jan. 21, 1947 |
| 2,578,590 | Perrault | Dec. 11, 1951 |

FOREIGN PATENTS

| | | |
|---|---|---|
| 10,241 | Norway | 1901 |
| 695,015 | France | 1930 |
| 773,717 | France | 1934 |